United States Patent [19]

Heckl et al.

[11] 4,052,378
[45] Oct. 4, 1977

[54] RED PIGMENT OBTAINED BY COUPLING DIAZOTIZED 4-AMINONAPHTHALIMIDE WITH 2,6-DIHYDROXY-3-CYANO-4-METHYL-PYRIDINE

[75] Inventors: Leonhard Heckl, Besigheim; Egon Liedek, Esslingen-Sulzgries; Wolfgang Ruff, Stuttgart-Rohracker, all of Germany

[73] Assignee: BASF Farben + Fasern AG, Hamburg, Germany

[21] Appl. No.: 651,072

[22] Filed: Jan. 21, 1976

[30] Foreign Application Priority Data

Jan. 30, 1975 Germany .............................. 2503732

[51] Int. Cl.$^2$ .................. C09B 29/36; C09D 11/00; D06P 1/04; D06P 1/44
[52] U.S. Cl. .................................. 260/155; 106/23; 106/288 Q; 106/301; 106/308 Q; 260/156; 260/22 CQ; 260/281 GC; 260/345.7 R
[58] Field of Search ............................... 260/155, 156

[56] References Cited

U.S. PATENT DOCUMENTS

| | | | |
|---|---|---|---|
| 3,438,961 | 4/1969 | Wallace et al. ...................... | 260/152 |
| 3,732,200 | 5/1973 | Bach .................................... | 260/144 |
| 3,875,139 | 4/1975 | Back et al. ......................... | 260/146 R |
| 3,941,766 | 3/1976 | Dimroth et al. ..................... | 260/155 |

OTHER PUBLICATIONS

Suszer et al., Chemical Abstracts, vol. 72, 8849r (1970).
Farbenfabriken, Chemical Abstracts, vol. 65, 17085h to 17086d (1966).
Gilman et al., "Organic Syntheses", Collective vol. I, 2nd Ed., pp. 457 to 459 (1951).

*Primary Examiner*—Floyd D. Higel
*Attorney, Agent, or Firm*—Hans Berman

[57] ABSTRACT

The azo dye of the formula

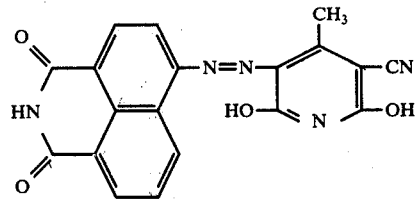

is a brilliantly red pigment which imparts lightfast and migration resistant color to printing inks, plastics, and the like.

1 Claim, No Drawings

RED PIGMENT OBTAINED BY COUPLING DIAZOTIZED 4-AMINONAPHTHALIMIDE WITH 2,6-DIHYDROXY-3-CYANO-4-METHYLPYRIDINE

This invention relates to azo dyes which are water insoluble pigments.

It has been found that the compound of the formula

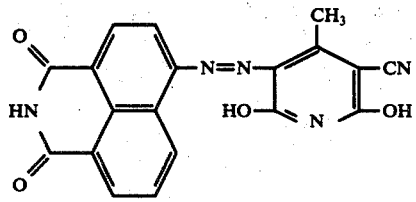

has a brilliant red color and may be incorporated in inks, plastics, and organic coatings where its high lightfastness, hiding power, chroma, migration resistance, and insolubility in water and most organic solvents are of advantage.

The compound is prepared without difficulty by coupling diazotized 4-aminonapthalimide with 2,6-dihydroxy-3-cyano-4-methylpyridine or by coupling diazotized 4-amino-naphthalic anhydride with the same coupling agent, and converting the naphthalic anhydride moiety of the coupling product to the naphthalimido group by reaction with ammonia. The starting materials are readily available.

The movel pigment is surprisingly superior to chemically closely related compounds in which the hydrogen of the imido group is replaced by alkyl or aryl, and to pigments whose diazo moiety is derived from 3-aminonapthalic acid.

Diazotized 4-aminonapthalimide couples readily with 2,6-dihydroxy-3-cyano-4-methylpyridine even in a strongly acidic medium. Preferably, a weakly alkaline solution of 2,6-dihydroxy-3-cyano-4-methylpyridine is added dropwise to the acidic suspension of the diazonium salt. The same procedure is used to advantage in coupling the diazotized 4-aminonaphthalic anhydride with 2,6-dihydroxy-3-cyano-4-methylpyridine.

The preferred diazotizing agent for 4-aminonaphthalimide is nitrosyl sulfate, whereas diazotized 4-aminonaphthalic anhydride is most conveniently obtained by adding an alkaline solution of 4-aminonaphthalic anhydride and sodium nitrite dropwise to a stoichiometrically equivalent amount of hydrochloric acid.

When wetting agents are present during the coupling reaction, the pigment formed is more readily dispersed. The crude pigment obtained by coupling is of adequate purity for most purposes and does not normally require further finishing by organic solvents.

The invention will further be illustrated by the following Examples. All part and percentage figures are by weight.

EXAMPLE 1

42.44 g 4-Aminonaphthalimide was gradually stirred into a mixture of 164.13 g 96% sulfuric acid and 65.08 g 40% nitrosyl sulfate at 25° to 30° C. After 2 more hours of stirring at 25° C, the solution so obtained was added with agitation to 1995 g ice water, whereby a suspension was formed which was further stirred for 45 minutes at 0° –5° C. A solution of 32.43 g 2,6-dihydroxy-4-methyl-3cyanopyridine and 8.32 g sodium hydroxide in one liter water was added drop by drop over fifteen minutes, and stirring was continued overnight. The precipitated pigment was filtered off with suction, washed with water on the filter until the filtrate was neutral, and then dried at 60° C.

The red pigment powder so obtained weighed 73 g. The product may be additionally finished by treating with solvents like nitrobenzene, o-dichlorobenzene, xylene, or butanol.

When the icewater employed for precipitating the diazonium compound contained 3.75 g of a coconut fatty acid amine acetate, 73 g readily dispersible, red pigment powder was obtained by the otherwise unchanged procedure.

When the solution of the coupling agent was used in the procedure outlined above contained 1.87 g of a carboxylic acid ester sulfonate or an equal amount of a six times oxyethylated oleic acid, the red pigment powder ultimately obtained in the same amount was particularly readily dispersible.

EXAMPLE 2

22.17 g 4-Aminonaphthalic anhydride and 8.32 g sodium hydroxide were dissolved in 280 ml water at elevated temperature. The solution was cooled to 0° C and 7.25 g sodium nitrite was added as an aqueous solution. The mixture was added dropwise at 0° C to dilute hydrochloric acid (260 ml ice water and 42.87 ml 32.2% hydrochloric acid), and the resulting suspension was stirred for 1 hour at 0° C. Thereafter, a solution of 15.91 g 2,6-dihydroxy-4-methyl-3-cyanopyridine and 4.3 g sodium hydroxide in 600 ml water was added dropwise. When coupling was completed, the suspenion so obtained was further stirred for 1 hour at 25° C, and briefly heated to a boil before being filtered with suction. The filtered solids were washed neutral on the filter and then dried at 80° C.

29.92 g of the anhydride dyestuff so prepared was added to 320 ml 25% aqueous ammonia at 25° to 30° C, and the mixture was stirred 2 hours at the same temperature and thereafter refluxed for 4 hours. It was then cooled and filtered with suction. The recovered solids were suspended in 1 liter water, adjusted to pH 1 with concentrated hydrochloric acid, briefly brought to a boil, and filtered hot. The solids on the filter were washed until neutral and then dried at 60° C.

The red pigment powder so obtained weighed 24 g. It was ready for use, but could further be finished with the solvents mentioned in Example 1.

EXAMPLE 3

Respective 80 g batches of a printer's varnish consisting of 35 parts hard resin, 25 parts linseed oil, 30 parts mineral oil, and 10 parts alkyd resin were ground on a three-roller refiner with 20 g pigment prepared according to Example 1 and 2 respectively. In each case, there was obtained a printer's ink furnishing brilliantly red impressions of great color intensity and high light fastness.

EXAMPLE 4

A synethetic resin composition was prepared from 70 parts polyvinyl chloride, 24 parts dioctyl phthalate, 1.5 parts lubricant, 1.8 parts barium-cadmium stabilizer, 2.4 parts epoxysoftener, and 0.3 parts UV-absorbent. When the composition was further mixed with 0.5% of the pigment powder of the invention on a roller mill at 170° C for five minutes, soft, red foils were obtained. Their light fastness was excellent. When one of the red foils was pressed between two colorless foils of the same resin composition, no pigment migrated into the colorless foils.

EXAMPLE 5

A lacquer based on a non-drying, short oil cocos fatty acid alkyd resin cross-linked by means of a non-plasticized melamine resin was mixed with 5% of the pigment of the invention. A steel sheet was coated with the pigmented composition and baked 30 minutes at 140° C. The baked coating was brilliantly red and lightfast. A second batch of the same lacquer was pigmented with 30% titanium oxide, and the red coating previously prepared was covered with the white lacquer which was also baked 30 minutes at 140° C. No migration of red pigment into the white top coat could be observed.

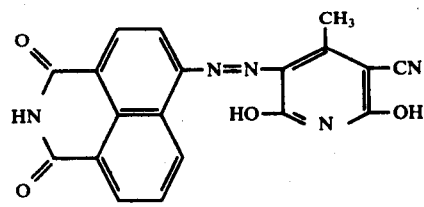

What is claimed is:
1. The compound of the formula